US005681023A

United States Patent [19]

Sheydayi

[11] Patent Number: 5,681,023

[45] Date of Patent: Oct. 28, 1997

[54] DAMPING SUPPORT MEMBER FOR AUDIO REPRODUCTION COMPONENTS, PARTICULARLY SPEAKER ENCLOSURES

[76] Inventor: Alexei Sheydayi, 1170 W. Chicago, Chandler, Ariz. 85224

[21] Appl. No.: 568,504

[22] Filed: Dec. 7, 1995

[51] Int. Cl.[6] .......... F16M 3/00

[52] U.S. Cl. .......... 248/638; 248/346.11; 248/632; 267/136

[58] Field of Search .......... 248/632, 346.11, 248/638, 674, 550, 580; 267/136

[56] References Cited

U.S. PATENT DOCUMENTS

| | | | |
|---|---|---|---|
| 1,883,893 | 10/1932 | Flaherty | 248/632 |
| 1,982,138 | 11/1934 | Herold | 248/346.11 |
| 2,944,366 | 7/1960 | Joabson | 248/346.11 |
| 4,493,471 | 1/1985 | McInnis | 248/580 |
| 4,643,385 | 2/1987 | Sandercock | 248/550 |

*Primary Examiner*—Ramon O. Ramirez
*Attorney, Agent, or Firm*—James H. Phillips

[57] ABSTRACT

A support member for use in groups of three or more to support and sonically damp a speaker enclosure. Each support member includes an intermediate piece which is preferably generally conical, a resilient damper element disk overlaying the piece upper, larger end and a pin extending downwardly from the piece lower, smaller end. The dimensions of the three principal components are selected such that a speaker enclosure is supported just above a carpet with the pin extending down through the carpet, through any backing or pad beneath the carpet and to an underlying rigid floor, typically concrete. This serves to directly couple the speaker enclosure to the massive substructure. The diameter of the pin is preferably no more than about one-eighths inch in order to prevent significant damage to the carpet and underlying pad. Preferably, the resilient damper element is fabricated from a urethane-based polymer material which achieves controlled additional damping in the critical bass frequencies.

14 Claims, 5 Drawing Sheets

DAMPING SUPPORT MEMBER FOR AUDIO REPRODUCTION COMPONENTS, PARTICULARLY SPEAKER ENCLOSURES

FIELD OF THE INVENTION

This invention relates to the art of high quality audio reproduction and, more particularly, to an isolator deuce for audio components. In one application, the invention especially relates to an isolator system for audio speaker systems.

BACKGROUND OF THE INVENTION

The electronic and electro-mechanical components of high quality audio reproduction systems have reached a state of development at which certain subtle effects are now recognized as adversely affecting the ultimate quality of reproduction which can be achieved from a given system. One such subtle effect is resonant vibration of one or more system components which particularly affects the reproduction of an input signal from a speaker in the bass regions. While this effect can be introduced in any component along the reproduction chain, the principal source of the resulting bass frequency distortion is in the speaker component itself. By the term "speaker" as used herein, it will be understood that a speaker system is actually contemplated; i.e., one or more true speaker components housed in a specially designed enclosure.

The enclosures are typically, but not always, fabricated from a dense wood material, and high quality speakers are usually relatively heavy because it is desirable to minimize the amount of sound emanating from the speaker cabinet itself as opposed to the intended sound waves introduced into the environment from the speaker cones or other transducing element as may be s employed. Still, it is impractical to completely eliminate the sound waves from impinging on the interior of the enclosure such that communication of these sound waves to the exterior of the enclosure, for potential issuance of a distorting sound wave component, is more or less inevitable.

Thus, attention has been given in the prior art to minimize this deleterious effect by undertaking to externally damp the speaker enclosure itself. It has been found that the effect is particularly prevalent when a speaker enclosure is place directly on a carpeted floor. The enclosure tends to "float" on the carpet such that no effective damping in the critical frequency range takes place. Thus, attention has been given in the prior art to attempting to minimize this deleterious effect by undertaking to externally damp the speaker enclosure itself, particularly when the speaker system is used in a carpeted room which is the most common installation environment for high quality systems.

Various expedients have been proposed for decoupling a speaker housing from a carpet. Stands which support the speaker enclosure above the surface of the carpet, typically several inches, have proven to be of limited use since the stands themselves rest on the carpet. In some installations, speakers have been suspended from a ceiling or wall, but other undesirable room resonance effects can be introduced with this approach, and it is usually both impractical and aesthetically unsuitable.

Another, somewhat more successful, prior art technique is to support a speaker housing on three or four identical devices which have a flat area at an upper end to support the speaker enclosure and a pointed lower end. The intent is to pierce the carpet and carpet backing/carpet pad to reach the rigid floor beneath the carpet, typically concrete or wood. While a certain amount of success in improving bass response has been obtained with this approach, there have also been distinct drawbacks. First, it is difficult to maintain the stability of a speaker enclosure merely resting on a plurality of these devices is unless they are either glued to or screwed to the bottom of the enclosure, and many owners of high quality speakers do not wish to accordingly mar their speakers. Second, the improvement in sound actually obtained is limited because there is a "hard" coupling through the device to the floor underlying the carpet. Third, the carpet is subject to serious and permanent damage.

It has also been proposed to use softer support devices of this general configuration, but using a lower end that is blunt to avoid piercing the carpet. However, this expedient still leaves the speaker enclosure more or less "floating" such that the desired improvement in performance is limited.

OBJECTS OF THE INVENTION

Therefore, it is a broad object of my invention to provide a support system for a speaker enclosure which at once serves to effectively isolate the enclosure from the directly underlying support surface, such as a carpet, and which serves to very effectively damp the resonant vibrations of the enclosure to provide a smoother bass response that substantially more nearly follows the frequency curve of an input signal.

It is another object of my invention to provide such a support system which minimizes actual damage and eliminates visual and functional damage to a carpet over which the enclosure is supported.

In another aspect, it is an object of my invention to provide a damping system which may be used to support any component of a high quality audio reproduction system, notwithstanding its principal contemplated use as a support system for a speaker system.

SUMMARY OF THE INVENTION

Briefly, these and other objects of my invention are achieved by supporting a speaker enclosure (or other audio system component) on three or more support members made in accordance with my invention. Each support member includes an intermediate, preferably generally conical, piece having a wider upper end and a narrower lower end, a resilient damper element disk overlaying the upper end and thus directly supporting the speaker enclosure; and a pin extending downwardly from the lower end. The dimensions of the three principal components are selected such that a speaker enclosure is supported just above a carpet with the pin extending down through the carpet, through any backing or pad beneath the carpet and to an underlying rigid floor, typically concrete. This serves to directly couple the speaker enclosure to the massive substructure. The diameter of the pin is preferably no more than about one-eighths inch in order to prevent significant damage to the carpet and underlying pad. Preferably, the resilient damper element is fabricated from a urethane-based polymer material which achieves controlled additional damping in the critical bass frequencies.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENT(s)

Figure 1:
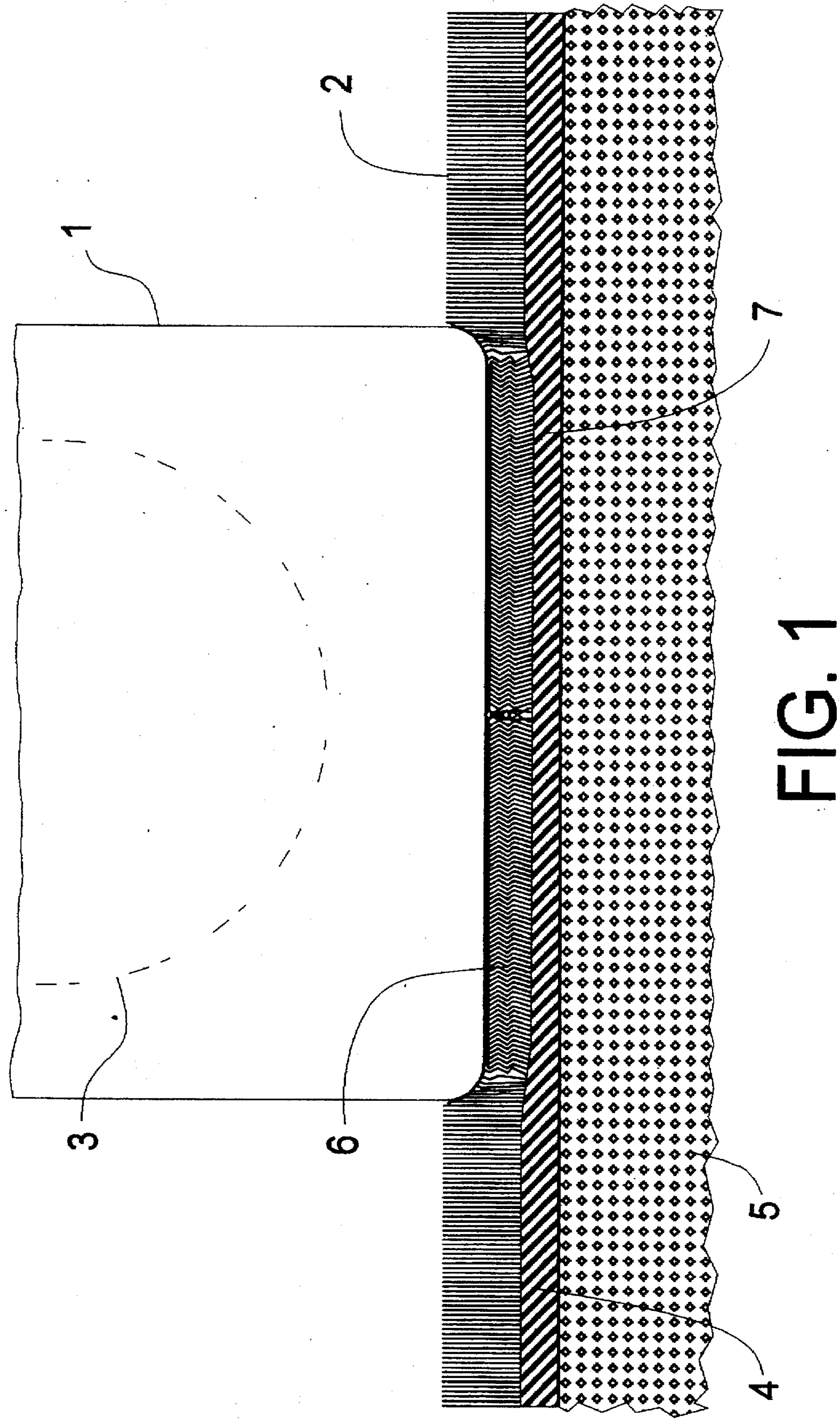
FIG. 1 is a partially pictorial, partially cross sectional generalized view of a speaker enclosure resting on a carpet.

Referring now to FIG. 1, there is shown a generalized representation of a speaker enclosure 1 resting on a carpet 2. As is well known in the art, the speaker enclosure 1 may contain one or more speakers 3, which serve to transduce an amplified signal into sound waves for the benefit of one or more listeners. The carpet 2 overlays a resilient layer 4 which may be backing affixed directly to the carpet and/or an underlying, separate carpet pad. The resilient layer 4, in ram, rests on a rigid floor structure 5 which is typically, but not always, concrete.

As those knowledgeable in the art of high quality audio reproduction will appreciate, when the speaker 3 is called upon to issue relatively powerful sound waves in the bass regions, the speaker enclosure 1, which is usually fabricated from a suitably rigid material such as a dense wood or wood composite, itself tends to vibrate to some extent, thereby adding its own component to the summation of sound waves emanating from the speaker system. With the commonplace arrangement shown in FIG. 1, the speaker enclosure 1, supported in the carpet region 6 on somewhat compressed and bent tufts, more or less sonically "floats" atop the carpet 2. In addition, the resilient layer 4 itself is somewhat compressed in the region 7 beneath the enclosure 1.

As a result, there is very little damping effect applied to the bottom of the speaker enclosure 1 because it is substantially decoupled from the rigid floor structure 5. Therefore, the unwanted sound component contributed by the vibrations present at the outer surfaces of the speaker enclosure 1 remain and result in frequency distortion in the bass regions which is measurable and discernible by ear.

Figure 2:
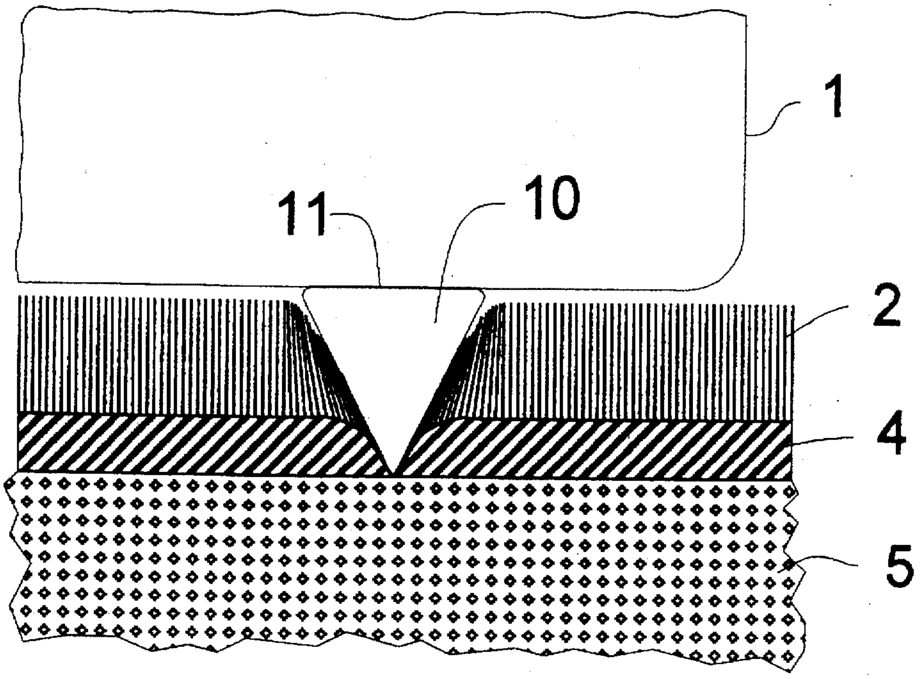
FIG. 2 (PRIOR ART)
FIG. 2 is a similar view of first prior art apparatus directed to addressing the problem of undesired bass frequency sound wave components originating at the outer surfaces of a speaker enclosure.
Figure 3:
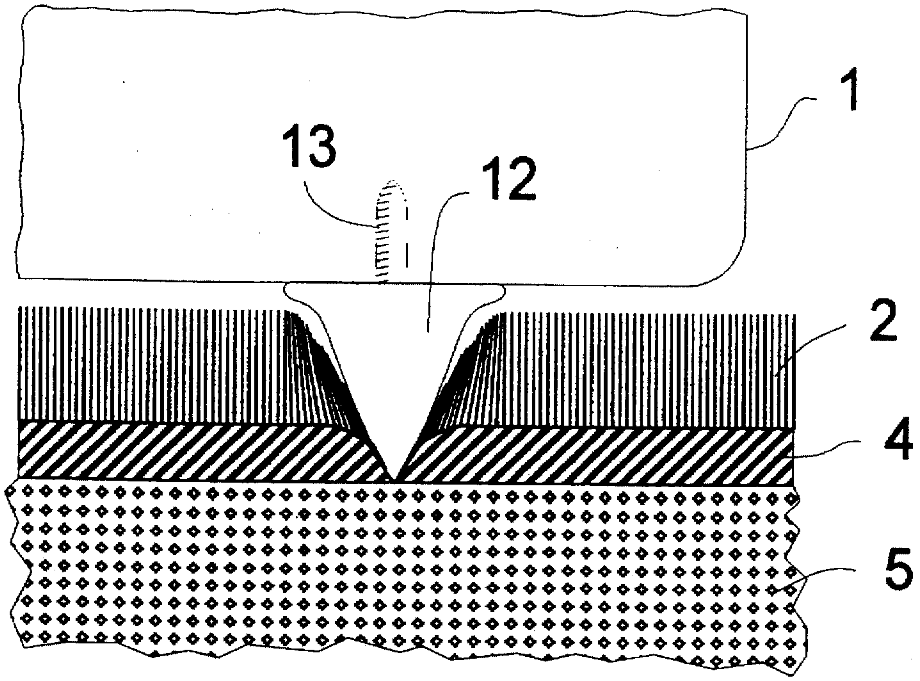
FIG. 3 (PRIOR ART)
FIG. 3 is a view similar to FIG. 2 showing a second prior art approach to addressing the same problem.

This undesirable effect of placing high quality speaker systems directly on a carpeted floor is known in the art of audio reproduction, and attention has been given in the prior art to applying various expedients intended to minimize this effect. FIGS. 2 and 3 show two closely related, exemplary prior art approaches to addressing the problem. In both exemplary prior art examples to be discussed, as well as in the use of the present invention as described below, advantage is taken of the fact that all sound-radiating external surfaces of a speaker enclosure will be damped if one surface, e.g., the bottom, is directly damped, thereby diminishing the undesirable sound emanations accordingly.

Attention is first directed to the prior art configuration shown in FIG. 2 in which a speaker enclosure 1 is illustrated as supported above a carpet 2 by a generally conical, downwardly pointing, sharp-ended support member 10. It will be understood that a plurality of support members 10 are distributed appropriately beneath the speaker enclosure 1 to provide relatively stable support. Typically, three or four such members are employed, and the preferred number is three because a three-point suspension is inherently more stable than a four-point suspension and will accommodate slightly out-of-level conditions. Thus, two support members 10 may be placed toward the front edge of the speaker enclosure 1 and inset therefrom and from respective fight and left comers while a third support member 10 may be positioned centrally across the breadth of the speaker enclosure 1 and just inside the rear edge.

The conical member 10, which is typically fabricated from metal such as brass or aluminum, extends downwardly through the carpet 2 and through the resilient backing 4 such that its pointed end rests directly on the rigid floor substrate 5. Therefore, the speaker enclosure 1 is brought into direct coupling with the floor 5 to obtain a certain amount of effective damping of the speaker enclosure 1 by virtue of the effect of the now-coupled relatively "immovable" mass of the floor. Consequently, the arrangement shown in FIG. 2 has been found to somewhat decrease the undesired sonic emanations from the outer surface of the speaker enclosure 1 in the bass frequency range.

However, there are drawbacks to the described use of the conical support member 10 in this configuration. First, in order to avoid unintentional physical movement of the speaker enclosure 1 when it is, for example, unintentionally bumped, it is necessary to positively fix the support member 10 directly to the bottom of the speaker enclosure 1 as by adhesive layer 11. Many owners of very high quality speaker equipment do not wish to mar even the bottom surface of their speaker enclosures in this manner. Second, both the carpeting 2 and the resilient layer 4 are permanently damaged by the use of the several conical support members 10 beneath the speaker enclosure 1 which is typically sufficiently heavy as to obtain the penetration necessary to effect engagement with the rigid concrete floor 5, thereby achieving the functional effect sought. Third, the functional effect achieved is limited by the fact that the coupling between the bottom of the speaker enclosure 1 and the support member 10 is "hard" whether or not an adhesive layer 11 is employed. As a result, the support member 10 itself contributes no substantial damping of the speaker enclosure 1 in the frequency range of interest.

FIG. 3 illustrates a similar prior art configuration in which a metal, generally conical support member 12 is screwed into the bottom surface of the speaker enclosure 1 as indicated by the threads 13. Functionally, the support member 12 performs equally as well as the support member 10 shown in FIG. 2; however, it also suffers from the same drawbacks. Further, since holes must be drilled in the bottom surface of the enclosure 1 to receive the threaded part 13 of the support member 12, the enclosure is even more radically marred.

Figure 4:
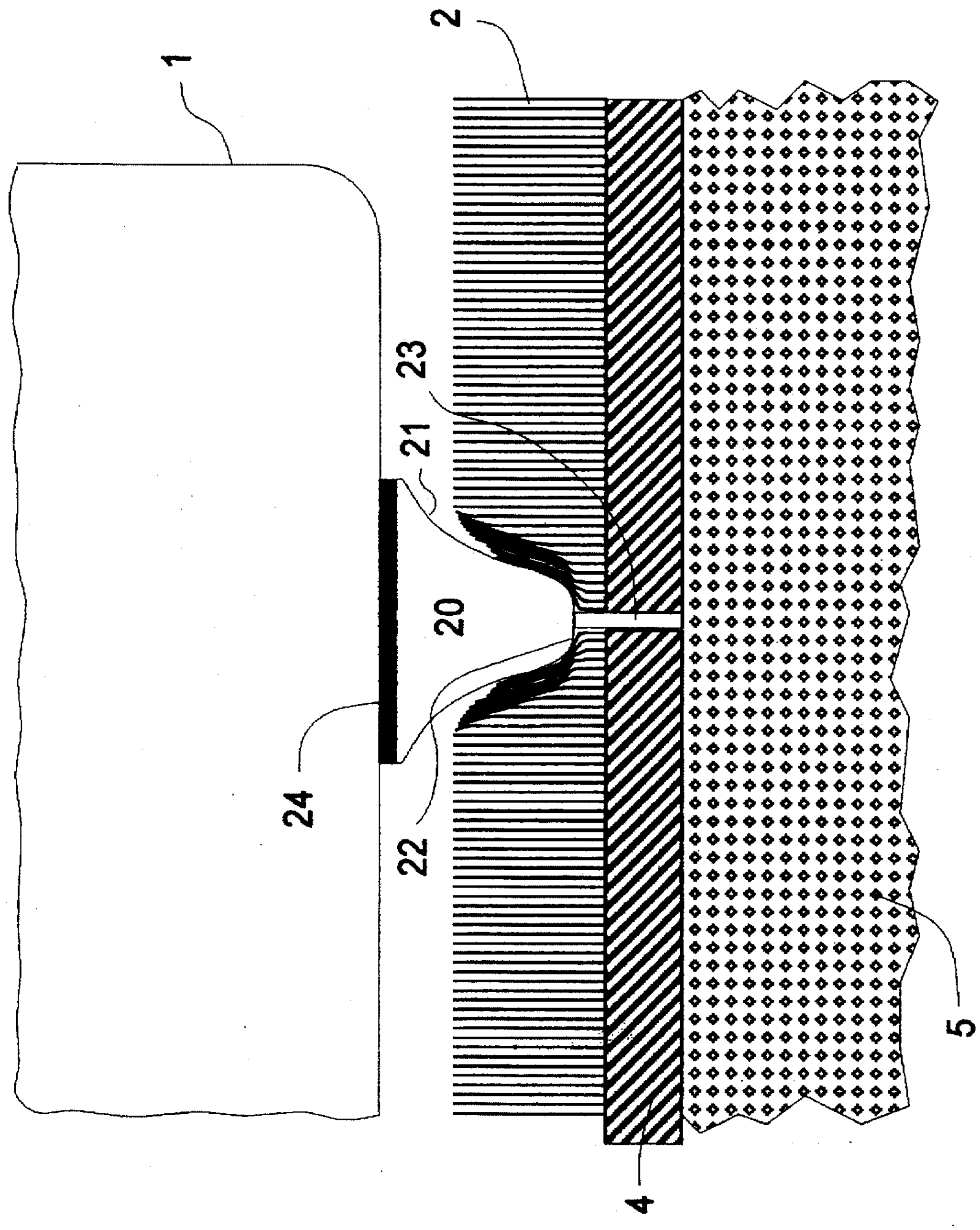
FIG. 4 is a view similar to FIGS. 2 and 3 illustrating certain features of the present invention by which the problem of undesired bass frequency sound wave components originating at the outer surfaces of a speaker enclosure is substantially solved.

Attention is now directed to FIG. 4, which illustrates a support member 20 according to the present invention. The support member 20 includes three principal components: a generally conical intermediate piece 21, a pin 23 and a resilient damper element 24. It will be observed that the intermediate piece 21 terminates, at its lower end, in a rounded, blunted, shape and that the blunt lower end 22 does not reach either the rigid floor 5 or the resilient layer 4 beneath the carpet 2. Instead, the pin 23 extends axially downwardly from the lower end 22 of the intermediate piece 21 of the support member 20 such that it is the pin which pierces the resilient layer 4 and impinges against the rigid floor 5 to take the compression stress. As will be discussed hereinafter, the dimensions of the pin 23 are chosen so that the cylindrical passage which the pin forces through the resilient layer 4 when first emplaced is sufficiently small in diameter that it effectively "closes up" when the support member 20 is removed.

It will therefore be understood that the combination of the blunted cone structure of the intermediate piece 21 of the support member 20 and the axially extending, cylindrical pin 23 which impinges to support substrate 5 serves to support the speaker enclosure 1 (there being, of course, three or more appropriately distributed support members 20 beneath the speaker enclosure 1) in such a manner that the carpet 2 is not damaged, and damage to the resilient layer 4 is not consequential.

An important component of the support member 20 is the resilient damper element 24 which is affixed to the circular upper surface of the intermediate conical piece 21. The resilient damper element 24 provides additional damping to the bottom surface of the speaker enclosure 1 which, as previously mentioned, serves also to beneficially damp all external surfaces of the speaker enclosure 1 in the bass frequencies. As will be discussed in more detail below, the characteristics and dimensions of the resilient damper element 24 must be carefully determined and employed in order to optimize the supplementary damping which is a further advantage enjoyed by the subject invention over the prior art structures shown in FIGS. 2 and 3. While the resilient damper element 24 need not completely overlay the upper surface of the intermediate piece 21, it is preferred, in this embodiment, that it be a disk of about the same diameter to obtain a compact and pleasing structure.

Figure 5:
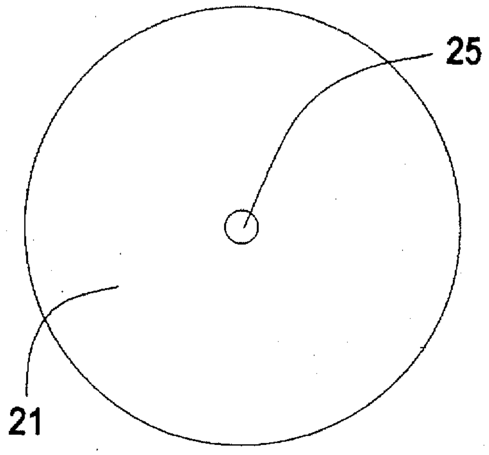
FIG. 5 is a bottom view of a principal component of a presently-preferred embodiment of the subject invention.
Figure 6:
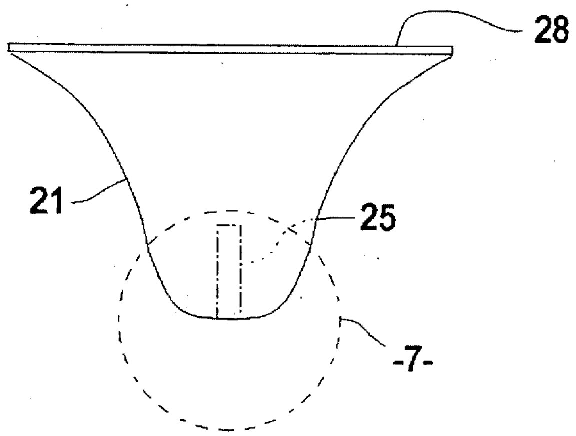
FIG. 6 is a side view of the principal component shown in FIG. 5.
Figure 7:
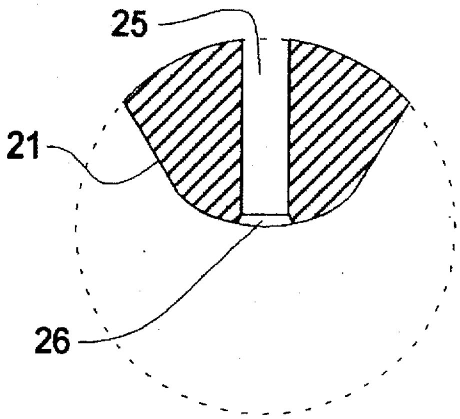
FIG. 7 is a detail view in the region - 7 - indicated in FIG. 6.

Consider now FIGS. 5, 6, 7 and 8 which illustrate certain details and variations in practical embodiments of my invention. FIG. 5 is a bottom view of the generally conical intermediate piece 21 showing an axial, cylindrical hole 25 which is adapted to permanently receive the pin 23 (FIG. 4) as will be described further below. FIG. 6 is a side view of the generally conical intermediate piece 21 again illustrating the planar upper surface 28 on which the resilient damper element 24 is positioned and the blunted lower end 22 from which the pin 23 extends (FIG. 4). It may be observed in FIG. 6 that the hole 25 extends only a fraction of the total height of the intermediate piece 21. The pin 23 is preferably force fit into the hole 25 which therefore should be dimensioned to obtain a force or shrink fit in the well known manner. FIG. 6 also identifies a detail region -7-. Thus, referring to FIG. 7, the opening at the lower end of the pin-receiving hole 25 is preferably chamfered in the region 26 to facilitate insertion of the pin 23 during the fabrication process.

Figure 8:
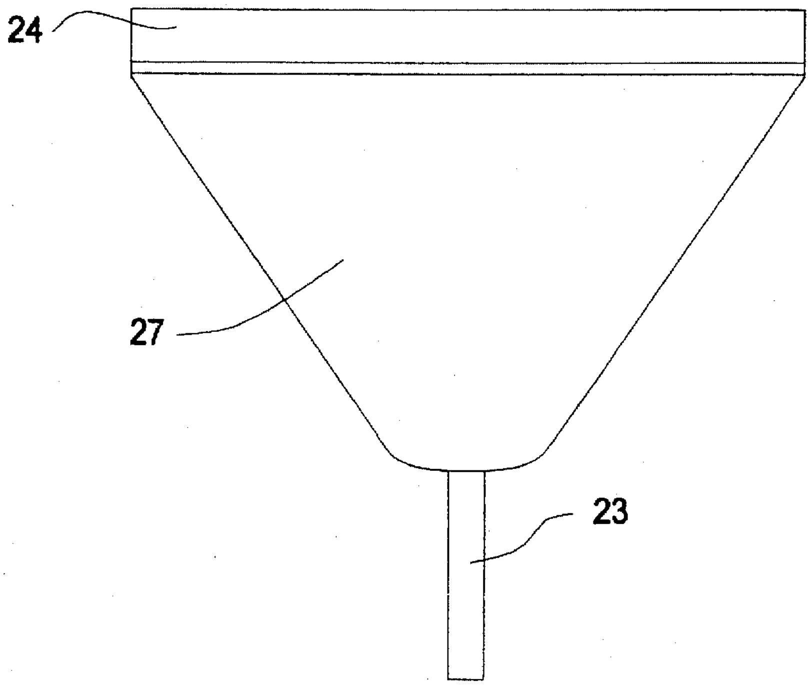
FIG. 8 is a side view similar to FIG. 6 illustrating an alternative configuration for a principal component of the invention.

FIG. 8 shows an alternative embodiment 27 of the intermediate conical piece from which the pin 23 downwardly depends and on the upper surface of which a resilient damper element 24 is emplaced. It will be understood that the differences between the profiles of the intermediate conical piece of embodiment of the invention shown in FIG. 8 and that shown in FIG. 4 are merely atheistic and that both are equally functional. It will further be understood that the intermediate piece need not necessarily be generally conical in shape although such is the presently preferred basic configuration which results in only very limited and temporary disturbance to a carpet in use. Merely by way of example, an inverted, truncated pyramid of three or more sides is functionally closely equivalent and acceptable.

Consider now additional details of a presently preferred embodiment of the invention. Referring to FIGS. 4–8 inclusive, the generally conical intermediate piece 21, 27, should be fabricated from a strong, rigid material and preferably a metal such as aluminum which may provided on its exterior surfaces with a black anodized finish to achieve a pleasing and durable appearance. Other metal materials, such as brass, are equally applicable. Most plastics do not have sufficient strength for the purpose and also introduce an additional damping factor, these aspects rendering plastic a less favored material for this component.

The height of the intermediate piece 21, 27 may be within the range of three-quarters of an inch to one and one-quarter inch and typically will be on the order of one inch. Similarly, the diameter of the upper planar surface 28 may be within the range of about one and one-half inch and two inches and typically about one and three-quarter inches. The pin 23 may extend axially downwardly about one-half inch to three-quarters of an inch and preferably about five-eighths inch to accommodate most carpet/pad environments. Of course, these various dimensions may be suitably adjusted according to a specific environment of use. However, the diameter of the cylindrical pin 23 should not exceed about one-eighth inch in order to prevent any meaningful damage to the carpet and underlying resilient layer as previously described. Conversely, it has been found that, with an appropriate material chosen, the pin 23 should be at least one-sixteenth inch in diameter to avoid breakage, and the presently preferred dimension is about three thirty-seconds inch diameter. The pin 23 must be fabricated from a strong, rigid material, and hardened stainless steel has been found to be ideal. Stainless steel not only enjoys the requisite strength advantages, but also will not rust, a condition which, if present, might cause both loss of long term structural integrity of the pin and a stain to the carpet.

The resilient damper element 24 may be rubber or a polymer and, in a presently preferred embodiment of the invention, this component is fabricated from a urethane-based, energy absorbing polymer to provide a damper element 24 thickness falling within the range of about 0.075 inch to about 0.125 inch and typically about 0.1 inch. The Shore "00" hardness of the resilient damper element 24 should preferably fall within the range of about 55–65, and a value of about 60 has been found to work well in the contemplated application.

Is The resilient damper element 24 has certain additional characteristics which are of benefit in practicing the invention. The urethane-based energy absorbing polymer material employed in presently preferred embodiments has an inherent slightly "tacky" surface characteristic. It has been found that this characteristic is sufficiently present to permit emplacing the individual support elements at the desired positions on the bottom of a given speaker enclosure such that they will satisfactorily adhere as the speaker enclosure bears down on them and will thereafter very effectively prevent any sort of unintended lateral movement of the speaker enclosure without the necessity to use, as in the prior art devices, the adhesive expedient shown in FIG. 2 or the screw expedient shown in FIG. 3. Nonetheless, the support members are easily subsequently peeled away from the bottom of a speaker enclosure and do not mar the surface thereof in any manner.

The expedient for fixing the resilient damper element 24 to the intermediate element 21, 27 must be compatible with the materials used for the interfacing components. With the use of urethane-based polymer and aluminum as described, employment of a glue from the family of cyanoacrylate adhesives results in a secure, permanent bond.

It has been found that three support members according to the invention are sufficiently strong to safely support a speaker enclosure weighing up to about 100 pounds, and three is the preferred number because it provides the most stable support. However, if a heavier speaker enclosure is to be supported, one or more additional support members may be employed to achieve the desired support capacity.

Figure 9:
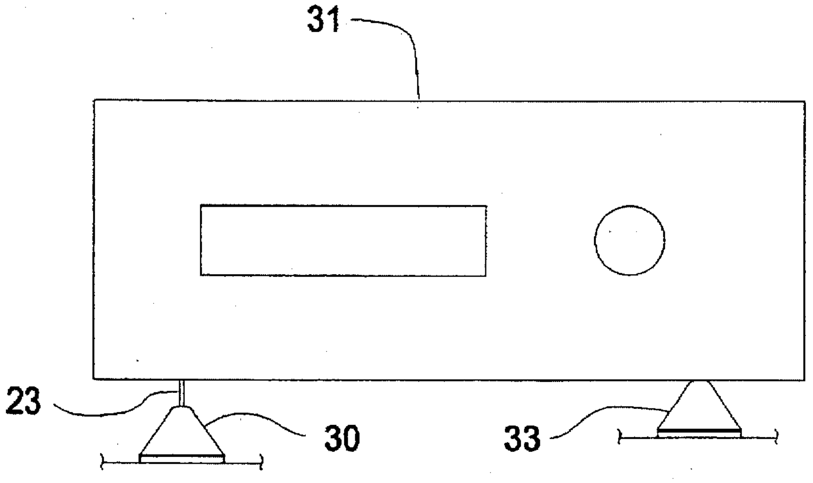
FIG. 9 is a simplified pictorial view illustrating the use of the subject invention in a diverse application.

In another aspect and use of the invention, those skilled in the audio reproduction art will understand that there is advantage in isolating one or more components, including both electronic and electro-mechanical components, of a given high quality audio reproduction system from direct or indirect external vibration sources. This function can readily be achieved, as shown in FIG. 9, by employing a previously described embodiment support member, with the pin 23 as at 30 or without the pin as at 32, in an "upside down" configuration in which a given component, such as a CD player 31, rests on the blunt end (or on the pin tip) of three or more of the support members.

While the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A support member for an audio component comprising:

A) an intermediate support piece having upper and lower ends, said upper end having a planar surface, said intermediate support piece being generally conically-shaped, having a wider upper end and a narrower lower end;

B) a resilient damper element at least partially overlaying said planar surface at said intermediate support piece upper end; and C) a pin extending downwardly from said lower end of said intermediate support piece.

2. The support member of claim 1 in which the diameter of said pin does not exceed about one-eighths inch.

3. The support member of claim 2 in which said resilient damper element is fabricated from a urethane-based polymer material.

4. The support member of claim 3 in which said intermediate piece has a height falling within the range of about three-quarters of an inch to about one and one-quarter inch.

5. The support member of claim 4 in which said resilient damper element has a thickness falling within the range of about 0.075 inch to about 0.125 inch.

6. The support member of claim 5 in which said pin extends downwardly from said lower end of said intermediate support piece for a distance falling with the range of about one-half inch to about three-quarters inch.

7. The support member of claim 3 in which said resilient damper element has a thickness falling within the range of about 0.075 inch to about 0.125 inch.

8. The support member of claim 7 in which said pin extends downwardly from said lower end of said intermediate support piece for a distance falling with the range of about one-half inch to about three-quarters inch.

9. The support member of claim 2 in which said intermediate piece has a height falling within the range of about three-quarters of an inch to about one and one-quarter inch.

10. The support member of claim 2 in which said resilient damper element has a thickness falling within the range of about 0.075 inch to about 0.125 inch.

11. The support member of claim 1 in which said resilient damper element is fabricated from a urethane-based polymer material.

12. The support member of claim 1 in which said intermediate piece has a height falling within the range of about three-quarters of an inch to about one and one-quarter inch.

13. The support member of claim 1 in which said resilient damper element has a thickness falling within the range of about 0.075 inch to about 0.125 inch.

14. The support member of claim 1 in which said pin extends downwardly from said lower end of said intermediate support piece for a distance falling with the range of about one-half inch to about three-quarters inch.

* * * * *